Figure 1:
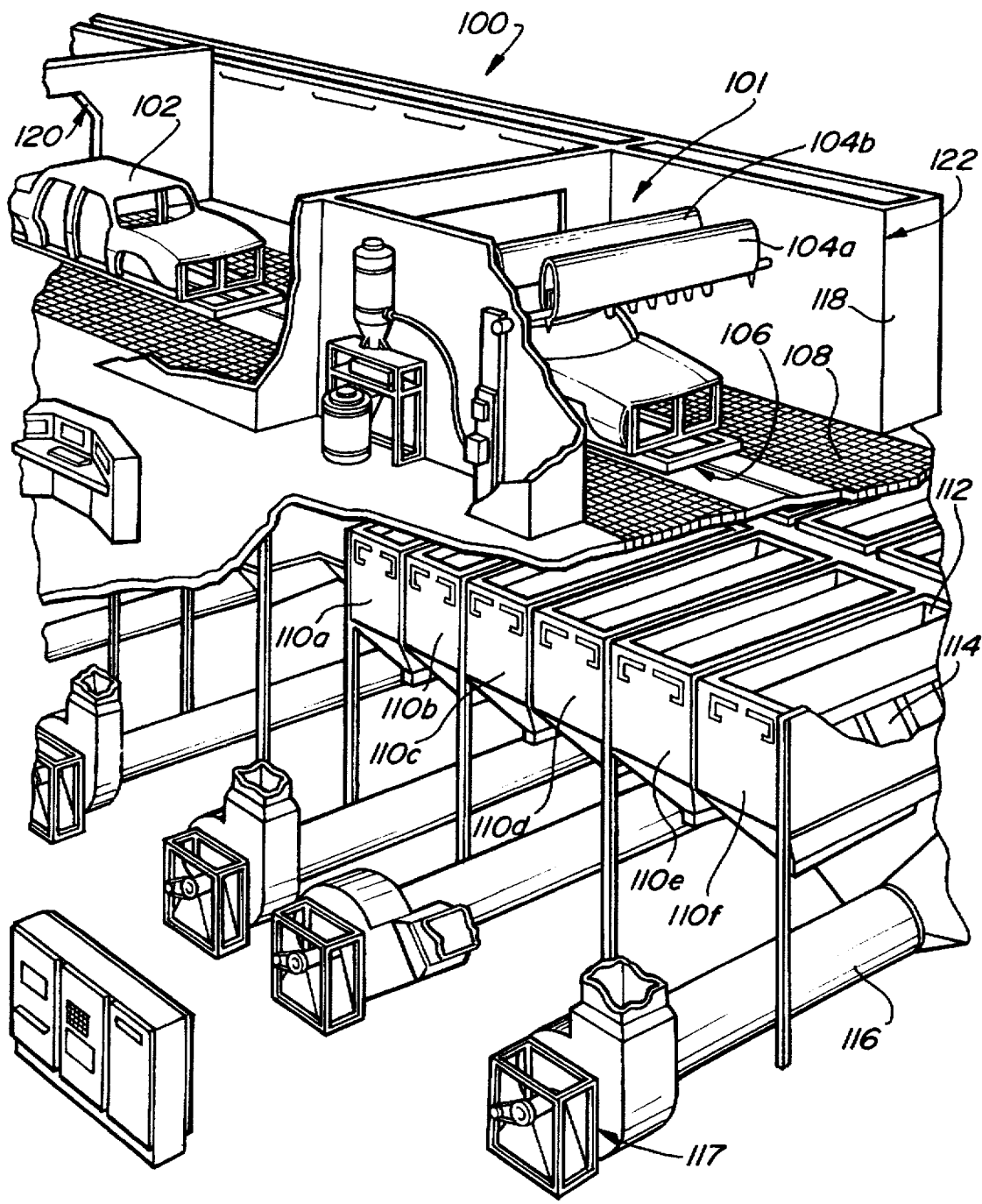

United States Patent [19]
Josefsson et al.

[11] Patent Number: 5,766,355
[45] Date of Patent: Jun. 16, 1998

[54] EXHAUST ARRANGEMENTS FOR POWDER SPRAY BOOTH

[75] Inventors: Leif E. B. Josefsson, Lake Orion; David O'Ryan, Clarkston, both of Mich.

[73] Assignee: ABB Flexible Automation Inc., New Berlin, Wis.

[21] Appl. No.: 527,102

[22] Filed: Sep. 12, 1995

Related U.S. Application Data

[63] Continuation-in-part of Ser. No. 315,126, Sep. 28, 1994.
[51] Int. Cl.$^6$ .................... B05B 15/12; B05C 12/00
[52] U.S. Cl. .................... 118/326; 55/DIG. 46; 454/50
[58] Field of Search .................... 118/326, 324, 118/305, 309, 628, 50; 454/49, 50, 53, 56, 61; 55/DIG. 46, 422

[56] References Cited

U.S. PATENT DOCUMENTS

| | | | |
|---|---|---|---|
| 1,697,079 | 1/1929 | Onsrud | 118/DIG. 7 |
| 3,741,155 | 6/1973 | Hunder | 118/634 |
| 3,921,576 | 11/1975 | Vertue | 118/634 |
| 4,045,524 | 8/1977 | Bornert | |
| 4,328,012 | 5/1982 | Telchuk, Jr. et al. | 95/217 |
| 4,338,364 | 7/1982 | Kennon et al. | 427/424 |
| 4,616,594 | 10/1986 | Itho | 118/326 |
| 4,901,666 | 2/1990 | Nagasaka et al. | 118/634 |
| 5,153,034 | 10/1992 | Telchuk et al. | |
| 5,178,679 | 1/1993 | Josefsson | 118/309 |

FOREIGN PATENT DOCUMENTS

| | | |
|---|---|---|
| 2 272 752 | 5/1974 | France. |
| 29 32 392 A1 | 2/1981 | Germany. |
| 2936367 A1 | 3/1981 | Germany. |
| 3640699 | 6/1988 | Germany. |
| 38 02 597 A1 | 8/1989 | Germany. |
| 1212617 | 2/1986 | U.S.S.R.. |
| 2160639 | 5/1988 | United Kingdom. |

*Primary Examiner*—Donald E. Czaja
*Assistant Examiner*—Calvin Padgett
*Attorney, Agent, or Firm*—Harness, Dickey & Pierce, P.L.C.

[57] ABSTRACT

A paint spray booth utilizes an exhaust system extending longitudinally along the path of the articles to be painted having an adjustment mechanism for varying the width of the exhaust inlets extending longitudinally for substantially the entire length of the air exhaust element and a downwardly slanting bottom surface of the exhaust elements for yielding powder overspray of uniform density to a filter media. Adjusting the width of the longitudinally extending exhaust inlet spreads an adjustable pressure drop over the slot opening. Adjusting the velocity of air flow through the exhaust elements substantially avoids powder paint build-up at the exhaust inlet. The slanted configuration of the exhaust elements, in conjunction with the adjustment mechanism, improves uniformity of filter life by providing a substantially even distribution of powder overspray to a filter media. The invention finds particular advantage in powder spray booth applications and is adapted to modularization thereby enabling retrofitting of existing spray booths with apparatus arranged in accordance with the principles of the invention.

15 Claims, 5 Drawing Sheets

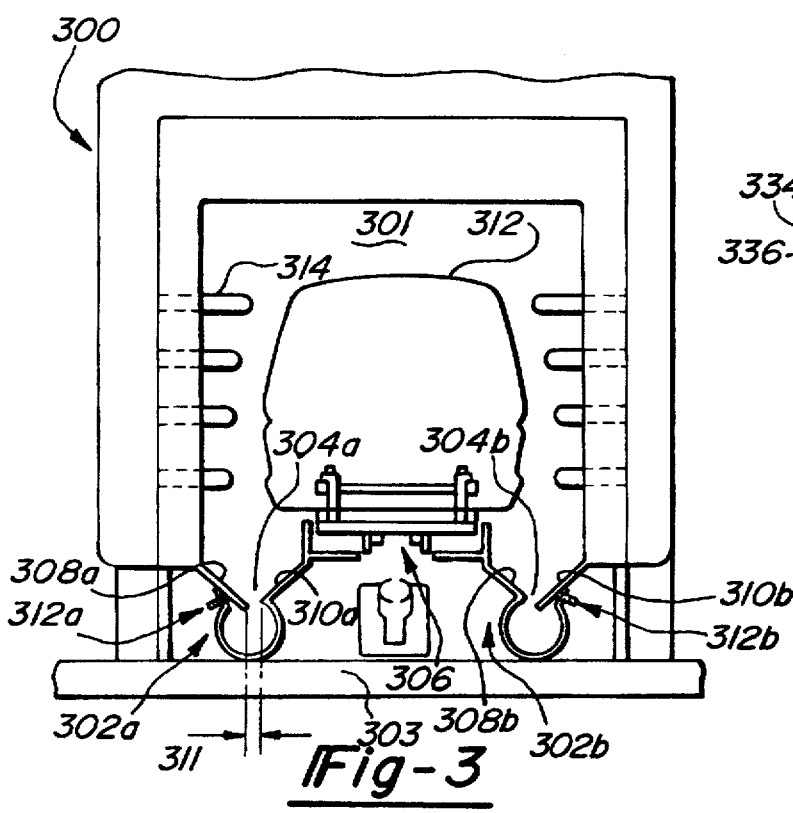
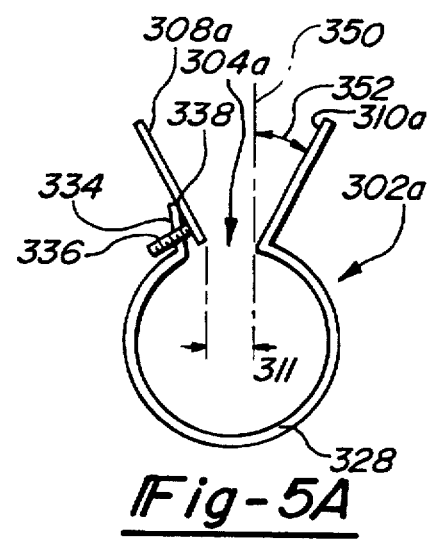
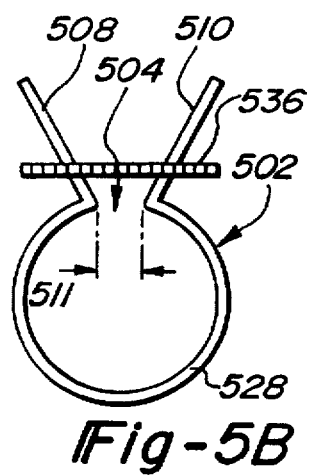
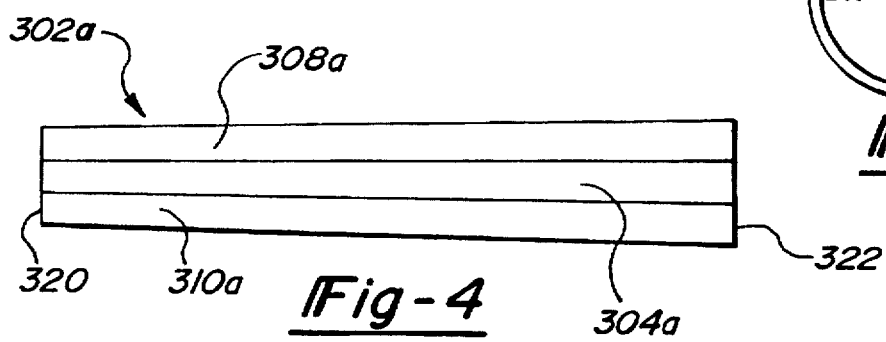
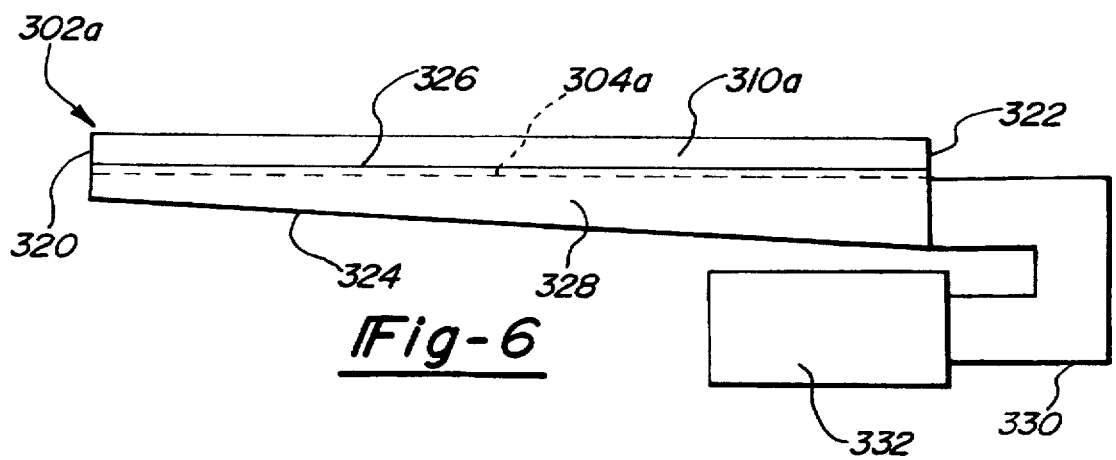

EXHAUST ARRANGEMENTS FOR POWDER SPRAY BOOTH

This is a continuation-in-part of United States patent application Ser. No. 08/315,126, filed Sep. 28, 1994.

BACKGROUND OF THE INVENTION

This invention generally relates to exhaust systems for paint spray booths. More particularly, the invention concerns air exhaust elements having an adjustment mechanism for varying the width of exhaust inlets extending longitudinally for substantially an entire length of a paint application zone in the booth and a downwardly slanting bottom surface of a duct of the exhaust element for yielding powder overspray of uniform density to a filter media.

Designers of conventional paint spray booths have traditionally attempted to improve paint exhaust efficiency therein. Much of the paint spray, especially in powder spray booths, never reaches the target being painted and becomes so called "overspray", which must be removed from an air stream in the booth.

In one type of known arrangement, multiple exhaust boxes are positioned along the path of the articles to be painted. Paint overspray gravitates into the lateral exhaust boxes and is passed through a cartridge filter. In this arrangement, the exhaust boxes positioned generally beneath the powder spray guns of the paint booth capture a greater percentage of the overspray than the other exhaust boxes. This configuration results in non-uniform powder overspray concentrations within the exhaust boxes and non-uniform filter life. Additionally, in booths of this type, quick access for filter replacement or maintenance is difficult to achieve. In some cases, sections of the grated flooring overlying the powder filtration apparatus must be removed for such access, thereby forcing increased booth down time.

Another known approach to recover overspray in a powder spray booth is taught in U.S. Pat. No. 5,178,679 to Josefsson, which is hereby incorporated by reference, wherein exhaust elements extend longitudinally along the path of the articles to be painted. Paint overspray gravitates through apertures that run the length of the exhaust elements and is conveyed to a recovery system. However, none of the art presently known to Applicant suggests using an adjustment mechanism to vary the width of an inlet opening of an exhaust element or a downwardly slanting bottom surface of an exhaust element to yield powder overspray of uniform density to a filter media regardless of the media's location along a longitudinal axis of the spray booth for improving uniformity of filter life.

SUMMARY OF THE INVENTION

Accordingly, the present invention provides an air exhaust system in a powder spray booth extending longitudinally along the path of the articles to be painted having a configuration including an air exhaust element with first and second surfaces sloping toward a bottom of the booth and converging toward a slotted opening forming an exhaust inlet extending longitudinally of the booth, and an adjustment mechanism for adjusting the width of the slot.

It is a feature of this invention that by adjusting the width of the exhaust element, a pressure drop is spread over the slot opening. By adjusting the velocity of air flow through the exhaust elements in a range of 3,000 to 5,000 feet per minute, powder paint build-up at the exhaust inlet is substantially avoided.

It is a further feature of the present invention that the slanted inlet wall configuration of the exhaust elements, in conjunction with the adjustment mechanism, improves uniformity of filter life by providing a substantially even distribution of powder overspray at the filter media's location.

BRIEF DESCRIPTION OF THE DRAWINGS

The objects and features of the present invention will become apparent from a reading of a detailed description taken in conjunction with the drawings, in which:

FIG. 1 is a perspective view of a paint spray booth utilizing a prior art booth air exhaust system;

FIG. 2 is a lateral sectional view of a paint spray booth incorporating prior art longitudinal air exhaust elements:

FIG. 3 is a lateral sectional view of a paint spray booth with an air exhaust system arranged in accordance with the principles of the present invention;

FIG. 4 is an overhead view of an air exhaust element of the booth of FIG. 3;

FIG. 5A is a lateral sectional view at one end of an air exhaust element of the booth of FIG. 3;

FIG. 5B is a lateral sectional view at one end of an alternative embodiment of an air exhaust element arranged in accordance with the principles of the present invention;

FIG. 6 is a partial sectioned side view of the air exhaust element of FIG. 4; and FIG. 7 is a partial sectional side view taken normal to a longitudinal axis of a spray booth and showing an alternative arrangement of exhaust ducts of the invention.

FIG. 8A is a lateral sectional view of an air exhaust element having a bidirectional adjustment on the inlet slot according to the principles of the present invention; and FIG. 8B is a detail view of the bidirectional adjustment device shown in FIG. 8A.

DETAILED DESCRIPTION OF THE PREFERRED EMBODIMENT

With reference to FIG. 1, a prior art paint powder spray booth 100 includes laterally aligned exhaust boxes **110*a–f* positioned beneath grated booth floor 108 to collect overspray from powder spray applicators such as 104*a* and 104*b* placed at various application stations longitudinally along booth 100. As an article such as automobile body 102 to be painted moves via a conveyor system 106 from an entrance end 120 of a paint spray application zone 101 of booth 100 to an exit end 122 of zone 101, paint is released from powder spray applicators 104*a* and 104*b*. Some of the paint from powder spray applicators 104*a* and 104*b* never reaches the articles 102 to be painted and becomes overspray. Overspray from the powder spray applicators 104*a,b* passes through grated floor 108, located on either side of the conveyor system 106 and gravitates through an exhaust inlet 112 of one of the exhaust boxes 110*a–f* which are laterally oriented just beneath the grated floor 108 on either side of the conveyor system 106 and adjacent the bottom edges of wall 118. The collected overspray in the exhaust boxes 110*a–f* is drawn through cartridge filters 114 and ducts 116 via exhaust fans 117** to a powder reclamation system (not shown) to prepare the exhausted overspray powder for reuse.

Some of the exhaust boxes, such as **110*a* and 110*b*, are located generally beneath the powder spray applicators 104*a,b*. These boxes 110*a,b* collect the majority of overspray, while the remaining exhaust boxes 110*c–f*, nearer the entrance end 120 or the exit end 122 of the paint spray application zone 101** collect relatively little overspray. The disproportionate amount of overspray collected in the exhaust boxes 110a,b and filtered by cartridge filters 114 causes the cartridge filters 114 in those boxes to wear out or become clogged in accordance with their longitudinal positioning along the booth at different rates requiring replacement at non-uniform intervals.

Figure 2:
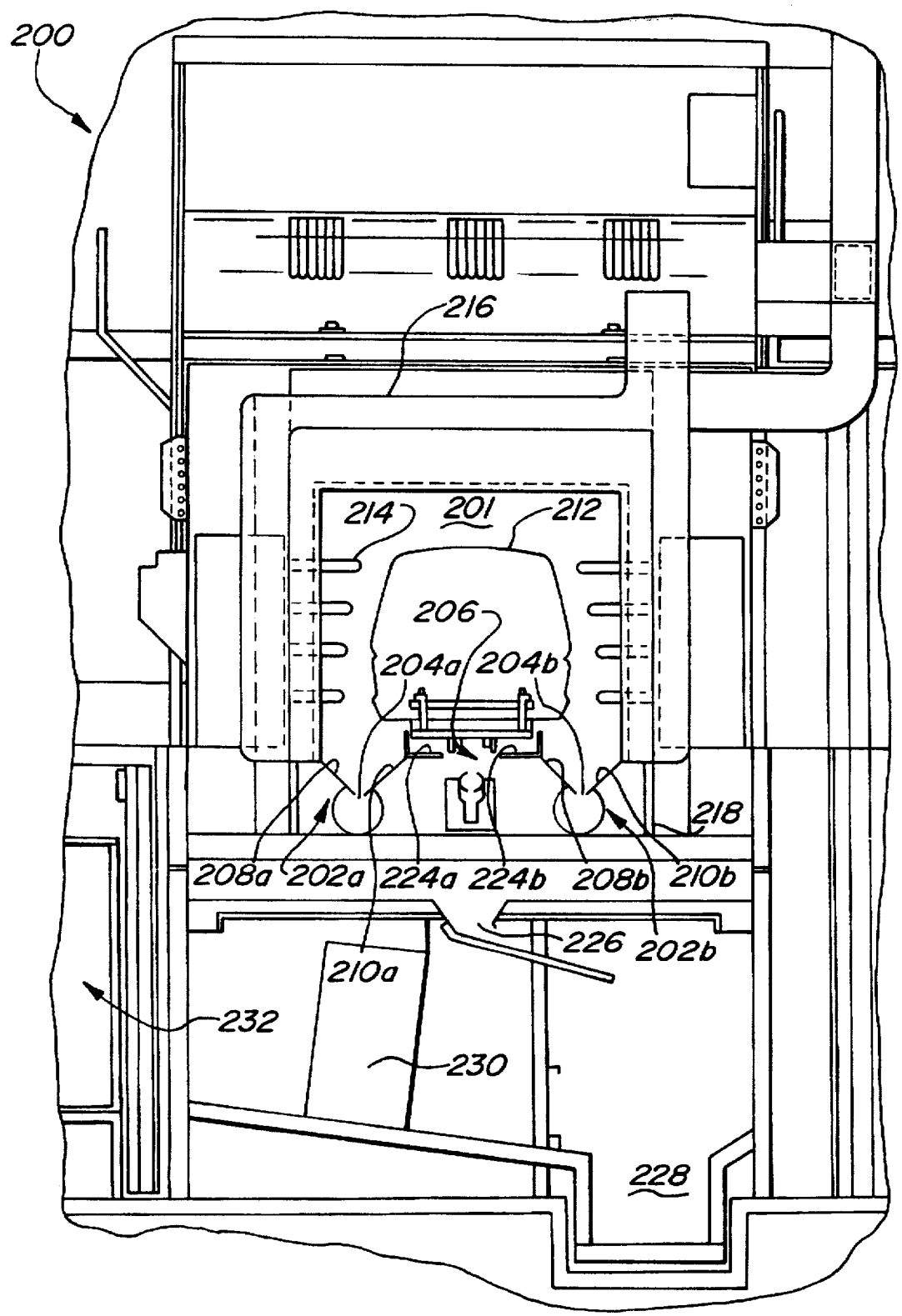

With reference to FIG. 2, a prior art powder spray booth 200 includes a paint application zone 201 with longitudinally extending exhaust elements 202a and 202b positioned beneath spray applicators 214. A pair of service access floor gratings 224a and 224b are located on either side of a conveyor system 206. Beneath the gratings 224a,b and the exhaust elements 202a,b is a conventional grated floor 220 of booth 200. The paint separator system comprised of venturi passage 226, powder-laden water recovery chamber 228, dewatering baffle labyrinth 230 and exhaust system 232, all located beneath grated floor 220 comprise a conventional arrangement which is isolated from (i.e., not in fluid communication with) longitudinally extending exhaust elements 202a and 202b which are located just above the grated floor 220 on either side of the conveyor system 206 and adjacent the bottom edges of wall 218. Powder overspray exhaust elements 202a and 202b respectively include first sloping surfaces 208a, 208b and second sloping surfaces 210a,b converging toward longitudinally extending slots 204a and 204b which form exhaust inlets in each longitudinal exhaust element for the withdrawal of spray-laden air therethrough.

Prior art booth 200 also includes a generally U-shaped or "horseshoe" shaped exhaust duct 216. In this prior art configuration, inwardly flowing, longitudinally directed air is additionally exhausted from the spray application area via the U-shaped or horseshoe shaped exhaust duct 216. The horseshoe shaped duct 216 withdraws the air from the booth and conveys it to a powder spray recovery area (not pictured) so that the overspray may be later applied to an article 212 to be painted by powder spray applicators 214.

Horseshoe or U-shaped exhaust duct 216 could optionally be used in some circumstances to supplement the air exhaust arrangement of the instant invention to be described. Additionally, either a conventional underbooth separator/exhaust system as shown in FIG. 2 or remote collectors can be used in conjunction with the present invention.

With reference to FIG. 3, paint spray booth 300 includes a tunnel-like paint application zone 301 through which objects 312 are passed for powder spraying by applicators 314. Exhaust elements 302a and 302b are located adjacent a conveyor system 306 along the path of an article 312 to be painted. Overspray from powder spray applicators 314 gravitates toward the bottom grated floor 303 of paint spray booth 300 where the overspray encounters respective first sloping surfaces 308a and 308b and second sloping surfaces 310a and 310b of elements 302a and 302b. Each pair of surfaces 308a, 310a and 308b, 310b converge respectively toward longitudinally extending slots 304a and 304b which each form an exhaust inlet of respective exhaust elements 302a and 302b for the withdrawal of spray-laden air therethrough. Adjusting mechanisms 312a and 312b enable the width of inlets 304a and 304b, respectively, to be varied. Adjustments to the width 311 of exhaust inlet 304a and/or 304b enable corresponding adjustment of air velocity through the inlet slot necessary to obtain a desired pressure drop over the slot openings. Additionally, one could optionally, selectively control the amount of downdraft air flow in different booth sections along the longitudinal extension of the exhaust inlets 304a,b by varying slot widths 311. For example, a lower air flow may be desired between paint application stations in the booth, or longitudinal flow of ventilating air could be promoted by lowering the exhaust air flow rates at the entrance and exit ends of the booth.

With reference to FIG. 4, the exhaust element 302a includes the first sloping surface 308a and the second sloping surface 310a converging toward the exhaust inlet 304a which extends substantially the entire length from a first end 320 of the exhaust element 302a to a second end 322 of the exhaust element 302a. The first and second sloping surfaces 308a, 310a convey paint overspray through longitudinally extending exhaust inlet 304a to yield powder of a uniform density for presentation via a filtered exhaust system to a powder reclamation device (not shown).

With reference to FIG. 6, a side view of the exhaust element 302a of FIGS. 3 and 4 is shown. The bottom-most point of the duct portion 328 is, in side section, seen as a sloping line 324 generated by imparting a larger circumference to the duct portion 328 as one proceeds along its longitudinal length (i.e. from left to right in FIG. 6). Hence the duct portion 328 has a surface sloping downwardly relative to a top edge 326 of duct portion 328 of the exhaust element from first end 320 of element 302a to second end 322. The sloping of duct portion 328, in conjunction with surfaces 308a and 310a and the longitudinally extending exhaust inlet 304a, provide an even distribution of powder in the air at outlet duct 330 and a constant velocity of exhaust air along the length of element 302a - typically 3000 to 5000 feet per minute. Such uniform velocity of powder overspray exiting the booth 300 via duct portion 328 substantially reduces paint build-up at exhaust inlet 304a.

Outlet duct 330 directs exhausted powder overspray to a preferably remotely located powder recovery system 332.

With reference to FIG. 5A, a first embodiment of a suitable exhaust slot width adjusting arrangement is shown. First and second sloping surfaces 308a, 310a converge toward a longitudinally extending slot 304a which forms the exhaust inlet of duct 328 for the withdrawal of spray-laden air therethrough. The first sloping surface 308a is hingedly attached to a support plate 334 by a hinge element 338. The hinge element 338 permits the slope of the first sloping surface 308a to be altered by a threaded element 336 which threadingly engages the support plate 334 and abuts at one of its ends first sloping surface 308a. The combination of the hinge element 338, the support plate 334, and the threaded element 336 provide an adjustment mechanism for varying the slope of the first sloping surface 308a, thereby adjusting the width 311 of the longitudinally extending exhaust inlet 304a. The present invention contemplates that the second sloping surface 310a can also be equipped with an adjustment mechanism to vary the width of the longitudinally extending exhaust inlet 304a, alone or in combination with an adjusting mechanism associated with surface 308a, such as shown in FIG. 5A.

The angle 352 defined by the intersection of the first or second sloping surfaces 308a, 310a with a line 350 extending perpendicularly to a plane of slot 304a has been found optimum if angle 352 is less than or equal to 45 degrees. Preferably this angle 352 lies in a range of 20 to 40 degrees with a preferred value of 30 degrees.

With reference to FIG. 5B, an alternate embodiment of a longitudinal exhaust element 502 includes a first sloping surface 508, a second sloping surface 510 and an exhaust duct 528 which are substantially pliable to facilitate adjustment. A threaded element 536 threadingly engages the first sloping surface 508 and second sloping surface 510 in opposite thread sense to provide an adjustment mechanism for adjusting the width 511 of a longitudinally extending exhaust inlet 504. Since element 536 is threaded in opposite senses in its engagement with surfaces 508 and 510, surfaces 508 and 510 will be drawn toward or away from each other as element 536 is rotated, thereby varying width 511.

It is understood that the adjusting apparatus of FIG. 5a or FIG. 5b is replicated at preselected positions along the longitudinal extent of the exhaust elements 302a and 302b so as to effect width adjustments along the entire length of inlet slots 304a and 304b.

In its preferred embodiment, the present invention includes at least two air exhaust elements, one on each side of the path of travel in the booth of the articles to be painted. In the preferred arrangements an even number of exhaust elements is used. More air exhaust elements permit lower building height or space below the grated floor of the booth. The number of air exhaust elements is limited by the width of the booth, the preferred angles defined by the sloping surfaces converging toward the exhaust inlet, or both. An operator may configure the system to create different flow rates or volumes in each longitudinal air exhaust element. Typically, the flow rate will be greater toward the outer walls of the booth than at the center thereof.

It is to be further understood that the invention contemplates virtually any arrangement for effecting adjustment of the exhaust slot width (e.g. 311 of FIG. 5A or 511 of FIG. 5B) in addition to the two example embodiments set forth in FIGS. 5A and 5B. For example, sliding partitions extending along a plane of the slot opening or deformable duct material capable of retaining its deformed shape are considered technically equivalent to the adjusting arrangements set forth herein.

Figure 7:
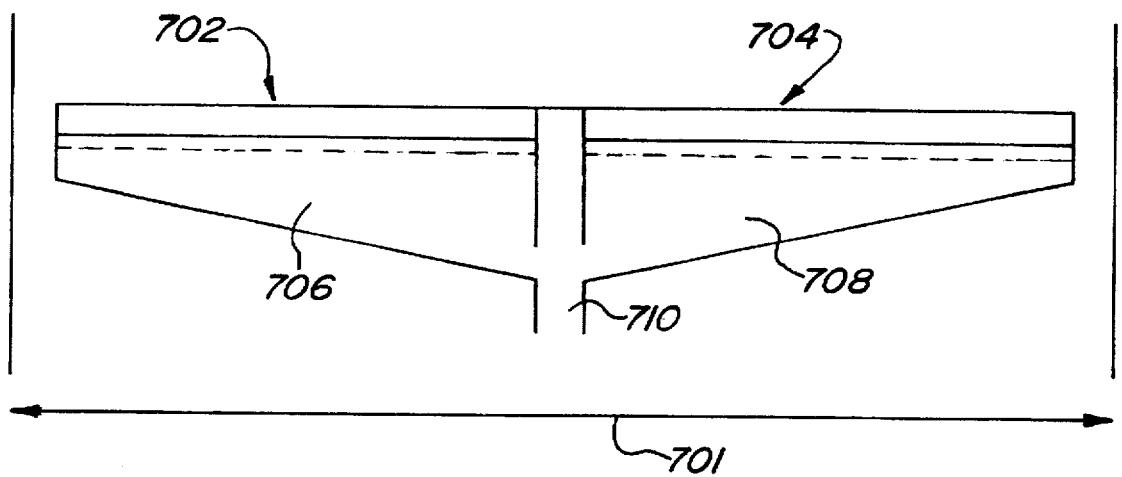

An alternative exhaust system arranged in accordance with the principles of the invention is set forth in FIG. 7, which is a longitudinal cross section of the bottom portion of a zone 701 of a powder spray booth. In any given zone, such as 701, exhaust elements could be arranged as shown in FIG. 7, such that pairs of exhaust elements 702 and 704, each having respective duct portions 706 and 708, with surfaces sloping from the ends of zone 701 downwardly toward an outlet duct 710 positioned at a preselected location along the longitudinal extent of zone 701.

Figure 8A:
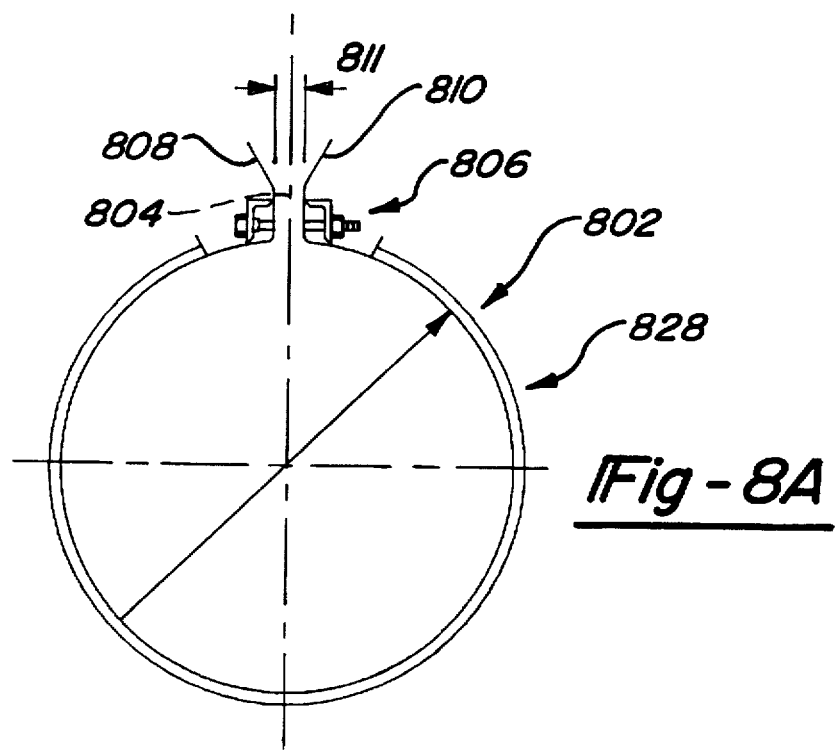
Figure 8B:
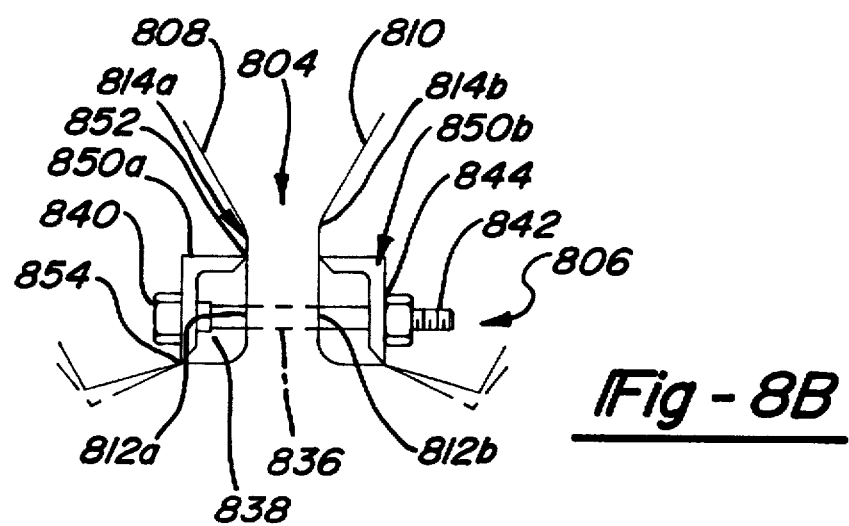

FIGS. 8A and 8B illustrate a further embodiment of a suitable exhaust slot with bidirectional adjusting arrangement. First and second sloping surfaces 808, 810 converge toward a longitudinally extending slot 804 which forms the exhaust inlet of duct 828 for the withdrawal of spray-laden air therethrough. The exhaust slot with bidirectional adjusting arrangement 806 is disposed below the first and second sloping surfaces 808, 810 and bidirectionally varies the width 811 of the exhaust inlet 804 of the exhaust element 802.

With specific reference to FIG. 8B, the bidirectional exhaust slot with adjusting arrangement 806 is shown in greater detail. The first and second sloping surfaces 808 and 810 each connect with substantially vertical sidewalls 814a, 814b. Each of the substantially vertical sidewalls 814a, 814b are provided with a plurality of bolt holes 812a, 812b. The bolt holes 812a, 812b receive bolts 836 which extend across the exhaust inlet 804. A pair of angle brackets 850a, 850b are disposed adjacent to each of the bolt holes 812a, 812b, and the bolt 836 extends through each of the angle brackets 850a, 850b. The angle brackets 850a, 850b are provided with contact surfaces 852 and 854 which contact the outer surface of the exhaust inlet 804. A nut 844 is welded to one of the brackets 850b and the bolt 836 is rotated relative to the nut 844 in order to draw the sidewalls 814 together or apart with respect to one another. The bolt 836 is also provided with a bolt collar 838 which is disposed on an opposite side of the angle bracket 850a as compared to the head 840 of the bolt 836.

In operation, rotation of the bolt 336 causes the sidewalls 814 of the exhaust inlet 804 to be symmetrically drawn toward or away from one another thereby providing a bidirectional adjustment for the exhaust inlet 804.

Finally, it will become apparent to those skilled in the art that the example arrangements of the invention set forth in FIGS. 3 through 6 readily lend themselves to modularization and retrofitting of existing conventional paint spray booths with traditional exhaust systems.

The invention has been described with reference to detailed descriptions of preferred embodiments given for the sake of example only. The scope and spirit of the invention are set forth in the appended claims.

We claim:

1. In a paint spray booth having a longitudinally extending paint application zone through which articles to be painted are moved from an entrance end to an exit end thereof, at least one air exhaust element extending longitudinally of the paint application zone, each of said at least one air exhaust elements including first and second surfaces sloping toward a bottom of the paint application zone and converging toward a slotted opening forming an exhaust inlet to an exhaust duct longitudinally extending along the paint application zone, the improvement comprising:

adjusting means for varying a width of the exhaust inlet along a length of the exhaust duct;

wherein a bottom-most surface of the exhaust duct slopes downwardly from one end of the exhaust element to a longitudinally opposite end of the exhaust element.

2. The improvement of claim 1 wherein the adjusting means further comprises a fixed member hingedly coupled to one of the first and second surfaces and means coupled between the fixed member and the one of the first and second surfaces for imparting relative pivoted movement therebetween.

3. The improvement of claim 2 wherein the means for imparting relative pivoted movement comprises a threaded member threadingly engaging the fixed member.

4. The improvement of claim 1 wherein each exhaust element is flexible, and wherein the means for adjusting comprises means for moving the first and second surfaces towards and away from each other.

5. The improvement of claim 4 wherein the means for moving comprises a threaded element threadingly engaging at least one of the first and second surfaces.

6. The improvement of claim 5 wherein the threaded element threadingly engages both the first and second surfaces such that rotation of the threaded element in a first rotational direction moves the first and second surfaces apart from each other and rotation of the threaded element in a second rotational direction moves the first and second surfaces toward one another.

7. The improvement of claim 4 further comprising the at least one air exhaust element having a surface of the exhaust duct sloping downwardly from one end of the exhaust element to an opposite end of the exhaust element.

8. In a paint spray booth having a longitudinally extending paint application zone having an entrance end and an exit end, a first exhaust element extending substantially longitudinally along a bottom portion of the paint application zone from a vicinity of the entrance end toward the interior of the zone and a second air exhaust element extending substantially longitudinally along a bottom portion of the zone from a vicinity of the exit end toward the interior of the zone, each of the first and second exhaust elements having a longitudinally extending slotted opening forming an exhaust inlet to a longitudinally extending exhaust duct and each of said first and second exhaust ducts having a bottom-most surface sloping downwardly respectively from the entrance and exit ends of the paint application zone toward the interior of the paint application zone.

9. The paint spray booth of claim 8 wherein each exhaust element includes adjusting means for varying a width the longitudinally extending slotted opening.

10. The paint spray booth of claim 9 wherein the adjusting means further comprises a fixed member hingedly coupled to the exhaust duct adjacent the slotted opening and means coupled between the fixed member and the exhaust duct for imparting relative pivoted movement therebetween.

11. The paint spray booth of claim 10 wherein the means for imparting relative pivoted movement comprises a threaded member threadingly engaging the exhaust duct.

12. The paint spray booth of claim 9 wherein each exhaust element is flexible and wherein the means for varying comprise s means for moving opposite sides of the slotted opening towards and away from each other.

13. The paint spray booth of claim 12 wherein the means for moving comprises a threaded element threadingly engaging the exhaust duct.

14. In a paint spray booth having a longitudinally extending paint application zone positioned above a grated floor of the booth through which articles to be painted are moved from an entrance end to an exit end thereof, at least one air exhaust element extending longitudinally of the paint application zone and positioned above the grated floor, each of said at least one air exhaust elements including first and second surfaces sloping toward a bottom of the paint application zone and converging toward first and second generally parallel side walls forming an exhaust inlet to an exhaust duct longitudinally extending along the paint application zone, the improvement comprising:

bi-directional adjusting means for varying a width of the exhaust inlet along a length of the exhaust duct, wherein the bi-directional adjusting means includes a plurality of threaded elements which extend across a slotted opening of said exhaust inlet, each of said plurality of threaded elements extending through openings in said first and second surfaces, wherein rotation of the threaded element in a first rotational direction substantially symmetrically moves the first and second surfaces apart from each other and rotation of the threaded elements in a second rotational direction substantially symmetrically moves the first and second surfaces toward one another.

15. The improvement of claim 14 further comprising the at least one air exhaust element having a surface of the exhaust duct sloping downwardly from one end of the exhaust element to an opposite end of the exhaust element.

\* \* \* \* \*

UNITED STATES PATENT AND TRADEMARK OFFICE
CERTIFICATE OF CORRECTION

PATENT NO. : 5,766,355
DATED : June 16, 1998
INVENTOR(S) : Leif E.B. Josefsson et al.

It is certified that error appears in the above-identified patent and that said Letters Patent is hereby corrected as shown below:

Column 4, line 56, after "308a" delete "." and insert --,--.

Column 6, line 6, "336" should be --836--.

Column 7, line 12, Claim 9, after "width" insert --of--.

Column 7, line 24, Claim 12, "comprise s" should be --comprises--.

Signed and Sealed this

Twenty-second Day of September, 1998

Attest:

BRUCE LEHMAN

Attesting Officer

Commissioner of Patents and Trademarks